Sept. 26, 1950  R. L. DICK  2,523,945
VARIABLE RATIO RING GEAR AND PINION ASSEMBLY
Filed July 22, 1949  7 Sheets-Sheet 1

Inventor
Ross Lee Dick
By
Attorneys

Inventor
Ross Lee Dick

Sept. 26, 1950  R. L. DICK  2,523,945
VARIABLE RATIO RING GEAR AND PINION ASSEMBLY
Filed July 22, 1949  7 Sheets-Sheet 5

Inventor
Ross Lee Dick
By
*Clarence A. O'Brien*
*and Harvey B. Jacobson*
Attorneys Sept. 26, 1950

R. L. DICK 2,523,945

VARIABLE RATIO RING GEAR AND PINION ASSEMBLY

Filed July 22, 1949

Inventor
Ross Lee Dick

By *Clarence A. O'Brien*
*and Harvey B. Jackson*
Attorneys

Fig. 15.

Patented Sept. 26, 1950

2,523,945

UNITED STATES PATENT OFFICE 2,523,945

VARIABLE RATIO RING GEAR AND PINION ASSEMBLY

Ross Lee Dick, Portsmouth, Ohio

Application July 22, 1949, Serial No. 106,268

10 Claims. (Cl. 74—347)

This invention comprises novel and useful improvements in a variable ratio ring gear and pinion assembly and more specifically pertains to a differential gear assembly for automotive vehicles incorporating therein an overdrive for varying the speed ratio of the vehicle propeller shaft to the axles.

The principal object of this invention is to provide a variable ratio ring gear and pinion assembly for differential mechanisms of automotive vehicles for providing what may be termed a regular drive and an overdrive selectively operative to vary the speed ratios between the propeller shaft and the axles of a vehicle.

A further object of the invention is to provide a variable ratio differential mechanism wherein the selection of the desired speed ratios may be readily effected by the driver of the vehicle and wherein the mechanism may be adjusted by power means in an improved manner.

A still further object of the invention is to provide a variable ratio differential mechanism having a pair of sets of ring gears and pinions which are alternately operatively engaged for driving the axles from the propeller shaft at different speed ratios.

Still another object of the invention is to provide an improved mechanism for varying the speed ratios of the ring gear and pinion assembly of a differential mechanism provided with locking means for automatically and positively preventing simultaneous engagement of both the normal gearing mechanism and the overdrive gearing mechanism.

A still further object of the invention is to provide an improved indicating system for visually informing the driver of the vehicle as to which of the alternately operable ring gear and pinion assemblies are in operative engagement.

And a final important object of the invention to be specifically enumerated herein is to provide a variable speed ratio ring gear and pinion assembly for the differential mechanism of automotive vehicles which shall be of compact, durable and highly efficient construction, and may be easily applied to conventional propeller shaft and axle assemblies of automotive vehicles.

These, together with various ancillary features and objects of the invention which will later become apparent as the following description proceeds, are attained by the present invention, preferred embodiments of which have been illustrated, by way of example only, in the accompanying drawings, wherein:

Figures 1, 3:
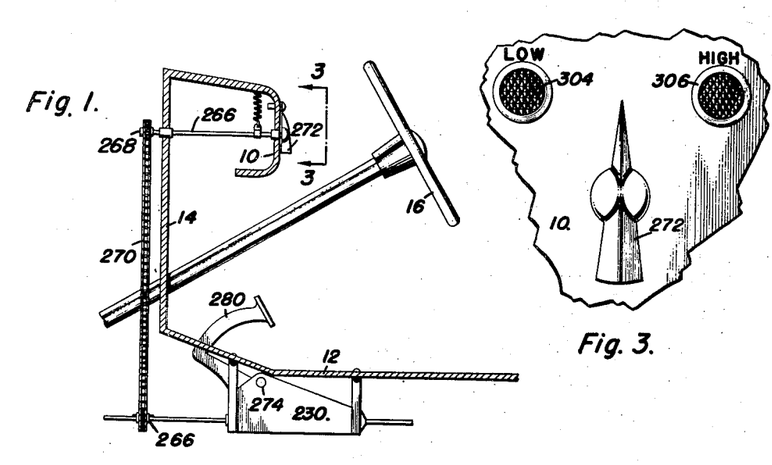
Figure 1 is a fragmentary view, partly in elevation and partly in vertical section, of a portion of an automotive vehicle showing the control mechanism of the invention.
Figure 3 is a fragmentary elevational view of a portion of an instrument panel showing the indicating lights and the control handle of the invention thereon.

Referring now more particularly to the accompanying drawings, wherein like numerals designate similar parts throughout the various views, attention is directed first to Figures 1–14 which illustrate the principles of the invention incorporated in a suitable embodiment. In Figure 1 is shown a portion of an automotive vehicle including an instrument panel 10, a floor board 12 and a fire wall 14 which divides the driver's compartment of the vehicle, in which is positioned the steering wheel 16, from the engine compartment of the same. Automotive vehicles further include as conventional structure with which this invention is concerned a differential casing indicated generally by the numeral 18, and which may be of any desired construction, and in which are journaled the customary axles 20 and 22 to which are attached and which drive the vehicle wheels, not shown, these axles being provided with the customary differential gearing indicated generally by the numeral 24, which gearing is, in turn, driven by a pinion shaft 26 mounted in suitable pinion bearings 28 and 30 carried by a pinion shaft housing 32 which may form a part of or may be attached to the differential housing 18.

The pinion shaft 26 may be connected in any desired manner, not shown, to the propeller shaft or drive shaft of a motor vehicle, which, as is well known, derives its power from the engine of the vehicle through the usual clutch or other control mechanism.

Customarily, in motor vehicles the pinion shaft is connected to the differential mechanism through a gearing which provides a fixed or predetermined speed ratio between the driving shaft or propeller shaft of the vehicle and the axles of the same. Since the load imposed upon vehicles by virtue of the grades of the roads traversed by the vehicle, the load carried by the vehicle, and the like, vary widely in usage, it is evident that the vehicle could function more efficiently if the gear ratio between the pinion shaft and the axles could be varied as desired. However, in view of the loads transmitted between the pinion gears and ring gears of the differential mechanism, the necessity for the exact lash or tolerance between the meshing gear teeth, and the provision of variable speed gearing between the pinion shaft and the differential mechanism to which the axles are attached have rendered it difficult to satisfactorily attain the desired result.

In accordance with the present invention, there are provided two separate ring gear and pinion sets of gearing, one forming what may be termed the regular gearing assembly, while the other constitutes what may be termed an overdrive assembly. These two assemblies provide different gear ratios for connecting the driving shaft with the axles, to thereby vary the speed ratio of the vehicle.

Figure 7:
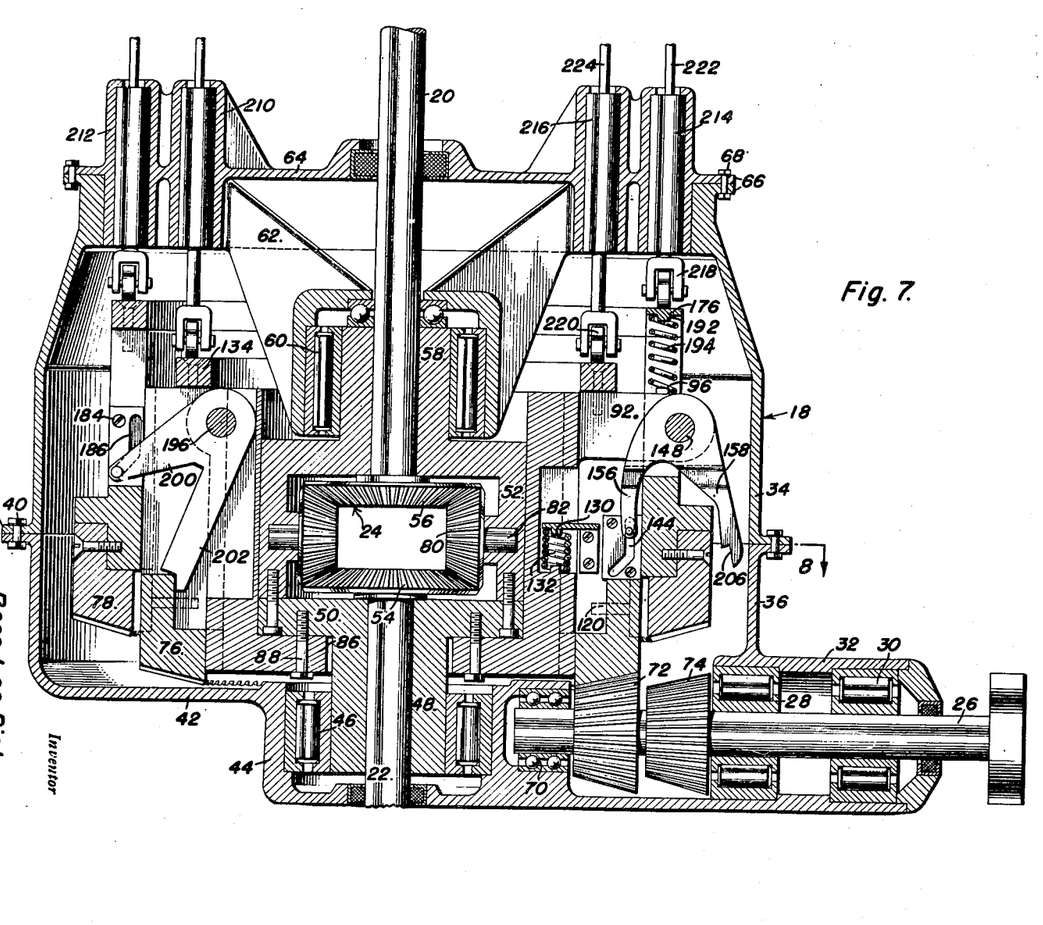
Figure 7 is a vertical sectional view through a vehicle differential gearing assembly with the present invention applied thereto, taken substantially upon the plane of the section line 7—7 of Figure 8; the parts being in their overdrive position.

As a satisfactory embodiment for carrying out the principles of this invention, attention is now directed more specifically to Figure 7 wherein it will be seen that the differential housing or casing 18 includes a pair of detachable housing sections 34 and 36 detachably connected with each other as by mating flanges 38 and fastening bolts 40. One of these sections, such as 36, may have the pinion shaft housing 32 integral therewith as illustrated; and is provided with an integral end wall 42 having an extending cup-shaped portion 44 in which is journaled, as by a bearing assembly 46, the hub 48 extending from the cover plate 50 of a differential housing 52. In accordance with conventional practice, the axle 22 is provided with a bevel axle gear 54 extending within the differential housing 52, and opposed to a corresponding bevel gear 56 carried by the other axle 20, which other axle is rotatably received in the hub portion 58 forming a part of the differential cage or housing 52, this hub portion being likewise rotationally journaled in anti-friction bearing assemblies 60 which are supported as by integral ribs or webs 62 from a cover plate 64 constituting a closure for the open outer end of the housing section 34.

This closure member 64 may be attached to the housing section 34, as by complementary flanges 66 together with fastening bolts 68.

As will also appear from Figure 7, the inner extremity of the pinion shaft 26 is journaled as by anti-friction bearings 70 in the housing section 36, and has fixedly secured thereto, either integrally or by keying or in any other suitable manner, a pair of pinions 72 and 74 which are alternately engaged with concentric ring gears 76 and 78, respectively, which are operatively connected with the differential housing or cage 52 and 50, as set forth hereinafter.

Figure 12:
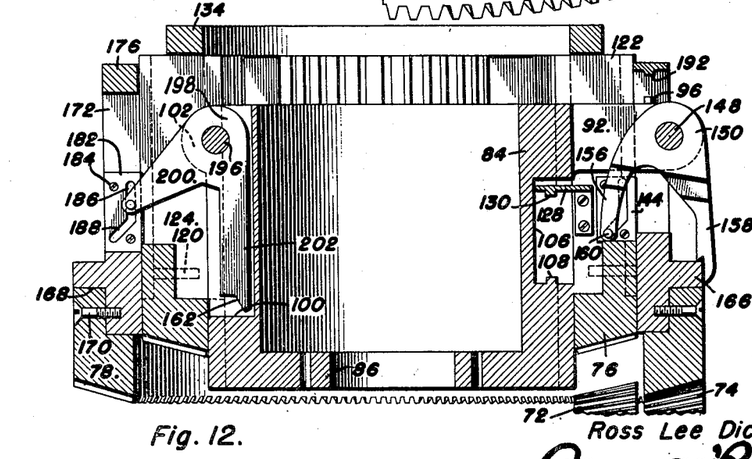
Figure 12 is a fragmentary view similar to Figure 7 but showing the parts in the regular driving position.

Preferably, the teeth of the various ring gears and pinions 72, 74, 76, and 78 are so chosen that when the pinion 72 is enmeshed with the ring gear 76, as illustrated in Figure 7, the axle assembly turns at a higher speed than when the ring gear 78 is enmeshed with the pinion 74, as shown in Figure 12; the former position being the overdrive position, while the latter is the regular gearing drive.

Figure 8:
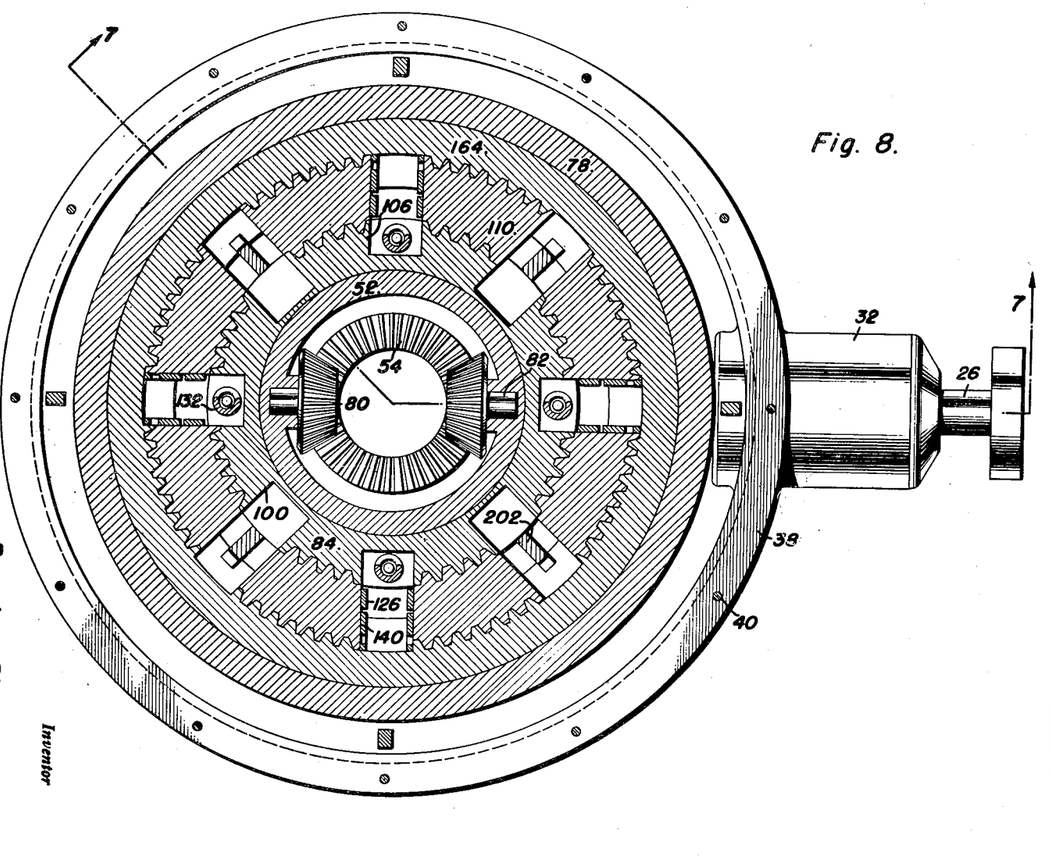
Figure 8 is a horizontal sectional view taken substantially upon the plane of the section line 8—8 of Figure 7.

It may be here noted that the differential gearing assembly is of any conventional and known design, and, as illustrated, includes the spider or differential gears 80, having stub axles 82 which are journaled in the interior walls of the differential casing 52, these idler or differential gears 80 constantly meshing with both of the bevel gears 54 and 56, as shown in Figures 7 and 8, the function of this differential gearing being so well known as to require no further explanation.

Figure 9:
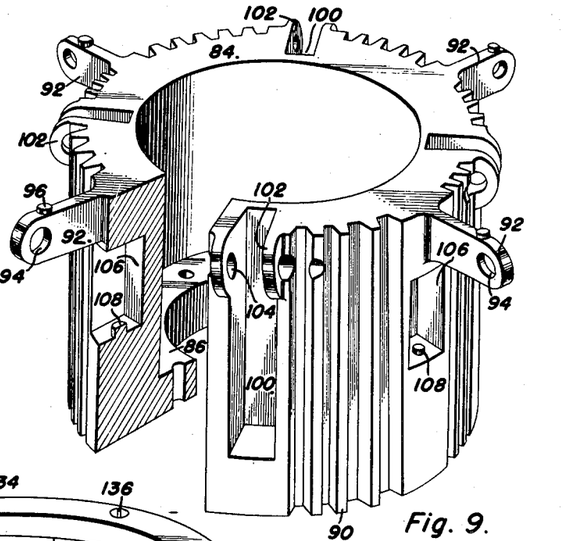
Figure 9 is a perspective view, parts being broken away, of a carriage forming an element of the invention.

Attention is now directed more specifically to Figures 7, 9 and 12, wherein there is illustrated the construction of a carriage or carrier for the two ring gear assemblies. This carriage comprises a sleeve-like member 84 which is slidably received upon the exterior surface of the differential cage members 52 and 50, and is rigidly secured thereto by means of an internal flange 86 and fastening bolts 88.

The exterior surface of the carriage 84 is provided with a plurality of axially or longitudinally extending splines 90 for a purpose which will later be set forth. Extending laterally and radially from the exterior surface of the carriage 84 at one end thereof are a plurality of arms 92, apertured as at 94, and having protuberances or projections 96 upon one of their surfaces for a purpose which will later be apparent. Disposed between the arms 92 are a plurality of radial notches or slots 100, the walls of these notches being provided with pairs of parallel lugs 102 which are apertured as at 104. Adjacent each of the arms 92, the carriage 84 is provided with axially extending recesses 106 which are provided with inwardly extending projections 108 upon one of their end walls.

It is intended the arms 92 and the lugs 102 will support pivoting locking members for selectively locking the regular drive ring gear and the overdrive ring gear into operative engagement with the pinions of the pinion shaft in a manner set forth hereinafter, the same forming a very important feature of this invention.

Figure 10:
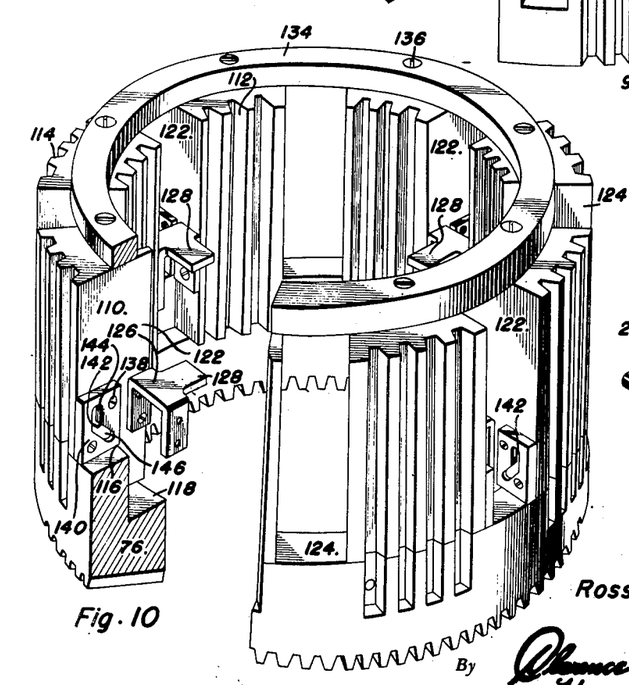
Figure 10 is a perspective view, parts being broken away, of the overdrive ring gear assembly forming a part of the invention.

Attention is now directed to Figure 10 for an understanding of the overdrive ring gear assembly, the association of this member with the carriage being illustrated in Figures 7 and 12. The overdrive ring gear assembly includes a sleeve member 110 which is internally splined and externally splined at 112 and 114, respectively, the internal splines being axially slidably engageable with the splines 90 of the carriage 84. At one end of the member 110, there is formed an annular shouldered recess 116 which engages and receives a correspondingly shouldered recess 118 of the ring gear 76, whereby the annular ring gear may be detachably secured to the overdrive sleeve 110, as by bolts indicated in dotted lines at 120 in Figures 7 and 12. As will be evident, it is thus possible to use the same overdrive sleeve 110 as a support for a series of interchangeable ring gear members 72, so that various predetermined speed ratios with respect to the driving pinion 72 may be obtained for the overdrive gearing assembly.

Extending axially inwardly from the end opposite the ring gear 76, the overdrive sleeve 110 is provided with a plurality of slots 122 and 124, these slots being equally distant and alternately spaced circumferentially of the sleeve, and respectively registering with the notches or slots 106 and 100 of the carriage 84. Secured to the walls of the slots 122 are brackets 126 having radially inwardly extending fingers 128 which are disposed in the slots 106 for axial movement therein.

As shown in Figure 7, these fingers are provided with bosses or projections 130 which are in alignment with the previously mentioned projections 108 for seating and retaining therebetween compression springs 132 which thus yieldingly urge the overdrive sleeve 110 axially of the carriage 84 in a direction which thus tends to separate the overdrive ring gear 76 from the overdrive pinion 72, this relative axial sliding movement of the overdrive sleeve and of the carriage being permitted and limited by axial movement of the fingers 128 in the slots or recesses 106.

Upon its end opposite the ring gear 76, the overdrive sleeve 110 is provided with an annular ring 134 detachably secured thereto as by fastening bolts or screws 136, this ring serving the dual functions of reinforcing and rigidly uniting the slotted end portions of the overdrive sleeve 110, and serving as a pressure plate by means of which axial movement is imparted to the overdrive sleeve against the resistance of the springs 132 by a mechanism and in a manner set forth hereinafter.

Secured to the opposite walls of the slots 122, as by screws 138, are cam plates 140 having angulated cam slots 142 therein. These slots consist of an axially extending portion 144 and an inclined portion 146.

Figure 13:
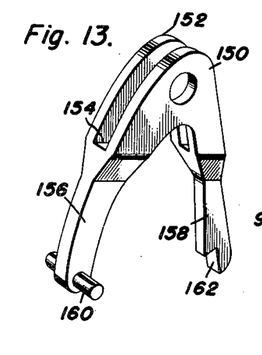
Figures 13 and 14 are perspective views, respectively, of locking elements for the sliding ring gear assemblies for the overdrive and the regular drive mechanism.

Pivotally mounted in the apertures 94 of the arms 92, as by pivot pins 148, are a plurality of locking or latching members, which, as shown in Figure 13, comprise bifurcated hub portions 150 and 152 which are slotted, as at 154, for straddling the arms 92, these latches terminating in angularly disposed integral extremities 156 and 158. The extremity 156 constitutes an operating arm and has laterally extending pins 160 which are received within the cam slots 142 for movement in the cam tracks 144 and 146; while the arms 158 constitute latch members, being provided with shouldered notches 162 which are selectively engageable with or disengaged from the regular ring gear assembly as set forth hereinafter. As will be seen by reference to Figures 7 and 12, the latch members for the regular drive are thus received and movable radially in the recesses or slots 122. The operation of these latch members will be set forth in detail hereinafter.

Figure 11:
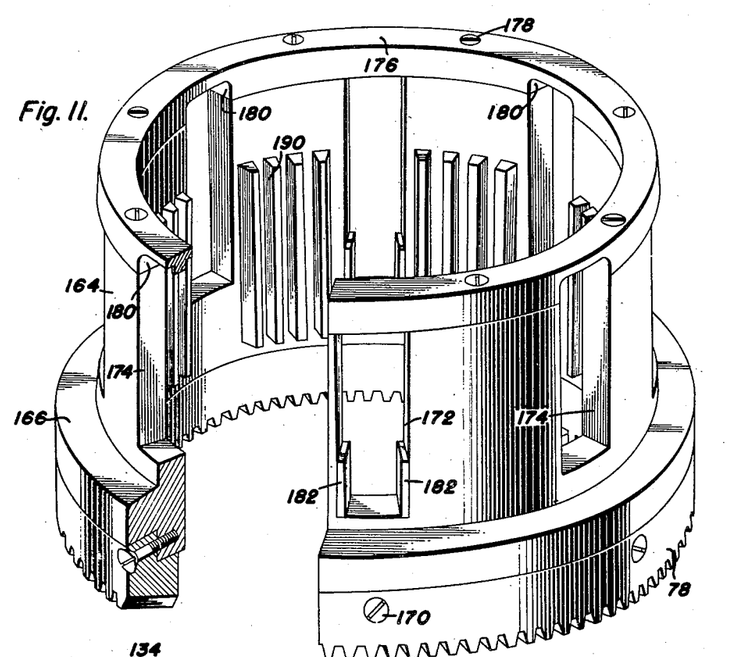
Figure 11 is a perspective view, parts being broken away, of the regular ring gear assembly forming a part of the invention.

Attention is now directed more particularly to Figure 11 in connection with Figures 7 and 12 for an understanding of the construction of the regular ring gear assembly.

This assembly includes a sleeve 164 provided at one end with a radially extending annular flange 166 which thus forms for the end of the sleeve an annular shouldered portion 168 for receiving the correspondingly shouldered portion of the regular ring gear 78, the latter being detachably secured to the sleeve, as by fastening screws or bolts 170.

The sleeve 164 is provided with equidistantly and alternately spaced axially or longitudinally extending notches or slots 172 and 174 which register with the notches of the overdrive sleeve and the notches 100 and 106, respectively, of the carriage sleeve. As in the overdrive sleeve, the regular ring gear sleeve 164 has its outer end and its notches closed by an annular ring 176 detachably secured as by screws 178, this ring likewise forming a pressure plate for actuating the regular drive sleeve as set forth hereinafter.

In registry with the notches 174, the inner surface of the ring 176 is cut away or recessed, as at 180, for a purpose which will be later apparent.

Opposite sides of the notches 172 are provided with cam plates 182 secured, as by screws 184, these plates having axially extending cam tracks 186 intersecting inclined cam tracks 188.

Upon its inner surface, the sleeve 164 is provided with sets of axially or longitudinally extending splines 190 adapted to slidably engage the external splines 114 of the overdrive sleeve 110.

As shown in Figures 7 and 12, the recessed portions 180 are provided with inwardly extending projections 192 which register with the previously mentioned projections 96 carried by the arms 92. These projections retain and seat therebetween compression springs 194 which thus serve to yieldingly urge the sleeve 164 and its ring gear 78 away from engagement with the pinion 74.

Figure 14:
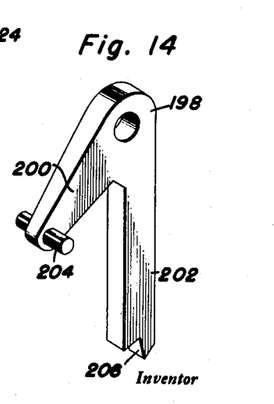

Journaled between the lug 102 of the carriage sleeve 84, as by pivot pins 196, are the hub portions 198 of a latching and locking member for the overdrive assembly. These locking members include integral actuating and latching arms 200 and 202, as shown in Figure 14, the outer extremities of these arms having transversely disposed actuating pins 204 receivable in the cam tracks 186 and 188, and a shouldered latching notch 206 adapted to selectively engage and release the shouldered upper end of the overdrive ring gear 76.

As will be apparent from Figures 7 and 12, the overdrive assembly latch is pivotally carried by the carriage sleeve and has its latching arm movable through the registering slots or notches 100 and 124 of the carriage sleeve and the overdrive sleeve respectively, while the actuating arm extends through the notches 124 and into the slots 172 of the overdrive and regular ring gear sleeves, respectively.

From the foregoing description, it will now be understood that the carriage sleeve and the regular ring gear sleeve are concentrically slidable upon each other and are concentric with and carried by the differential housing members 52 and 50.

Further, compression springs respectively seated in the recesses 106 and carried by the arms 92 of the carriage sleeve yieldingly urge the overdrive sleeve and the regular ring gear sleeve towards their inoperative positions with respect to the pinions.

It will be understood that the latch members of Figures 13 and 14 are so proportioned, and the cam tracks of the plates 140 and 182 are so shaped and synchronized with respect to each other that the latches are alternately engaged and released from their respective ring gear sleeves.

Thus, as shown in Figure 7, the parts of this mechanism are in their overdrive position with the pinion 72 meshing with the overdrive ring gear 76, while the pinion 74 is disengaged from the regular drive pinion 78. In this position, the overdrive sleeve is moved inwardly against the pinion, against the opposition of the compression springs 132, by the application of pressure upon the pressure plate 134, by a mechanism to be later described. This inward movement of the overdrive sleeve has moved the actuating end of the overdrive latch into the radially outward portion 188 of the cam plate 182, thereby urging the latching arm 202 radially outward, so that the latching notch 206 is now engaged with the shouldered upper portion of the ring gear 76 as shown on the left-hand side of Figure 7. At the same time, this inward movement of the overdrive sleeve has caused the operating pins 160 of the regular ring gear latching members, which are pivoted upon stationary fulcrums carried by the carriage plate, to move radially outwardly of the ring gear assemblies, thereby moving their latching arms 158 and the latching shoulders 162 out of engagement with the annular flange 166 of the regular ring gear sleeve, as shown at the right in Figure 7, so that the springs 194 are now free to cause an outward movement of the regular ring gear sleeve to retract the same or withdraw the same from the pinion 74.

When it is desired to shift from the overdrive position of Figure 7 to the regular drive of Figure 12, the operating means which pressed against the pressure plate 134 and forced the overdrive assembly into operation is released, and an operating means of the construction to be set forth hereinafter is then energized to press against the pressure plate 176 of the regular ring gear sleeve, thereby positively forcing the regular sleeve 164 and its ring gear 78 towards its driving pinion 74. This positive inward motion of the regular gear sleeve 164 is effected against the compression of the springs 194, and positively releases the overdrive latching members and subsequently locks the regular drive sleeve into engagement for establishing a regular driving connection between the driving pinion and the differential mechanism. For this purpose, initial inward movement of the regular drive sleeve moves the cam plates 182 downwardly with respect to the operating pins 204, so that the latter move from the inclined tracks 188 into the radially inward, axially extending tracks 186. This inward motion causes a pivoting of the overdrive locking members about their pivots 196, thereby causing a radially inward oscillating motion of the latch arms 202, thereby withdrawing the latch notch 206 from its engagement with the upper shouldered portion of the overdrive ring gear 76, this latching arm then moving into the recess 100 of the carriage sleeve 84, whereby the overdrive sleeve is now permitted, under the force of its compression springs 132, to move outwardly or away from the pinion 72, so that the overdrive connection is disengaged. Further inward movement of the regular drive sleeve now causes the actuating pins 160 on the actuating arms 156 of the regular drive sleeve lock members to move from the axial cam tracks 144 to the bottom or extremity of the inclined track portions 146, causing a radially inward movement of this locking member whereby its notched portion 162 is engaged with the annular flange 166 to thus lock the regular drive sleeve in its engaged position with the ring gear 78 engaged with the pinion 74 as shown in Figure 12.

It will thus be seen that initial movement of the thus engaged sleeve first releases the locking members of the engaged sleeve, whereby their springs may disengage the engaged sleeve; and further movement then engages the idle sleeve and actuates its locking members to latch this sleeve in driving engagement.

Attention is now directed to Figures 1 to 7 for an understanding of the operating mechanism controlling and indicating the positions of the regular drive sleeve and the overdrive sleeve.

Referring now to Figure 7, it will be seen that the cover plate 84 is provided with a plurality of guide cylinders formed in two concentric sets, the inner circle of cylinders being indicated by the numeral 210 while the outer row is indicated at 212. Guidingly slidable in each of these cylinders is a plunger 214 for the outer row of cylinders, and 216 for the inner row. At their lower ends, the plungers of each row are provided with bifurcated extremities 218 in which are journaled rollers 220. These rollers are adapted to bear against the pressure plates 134 of the overdrive sleeve and 176 of the regular drive sleeve.

As so far described, the overdrive and the regular drive sleeves and their associated locking elements can be operated by means of the respective plungers 214 and 216 in any suitable manner, such as by a manual control means of desired, or any suitable power operating means. However, in order to best realize the principles of this invention, it is preferred to operate the plungers by a hydraulic actuating mechanism to be now set forth.

Figure 2:
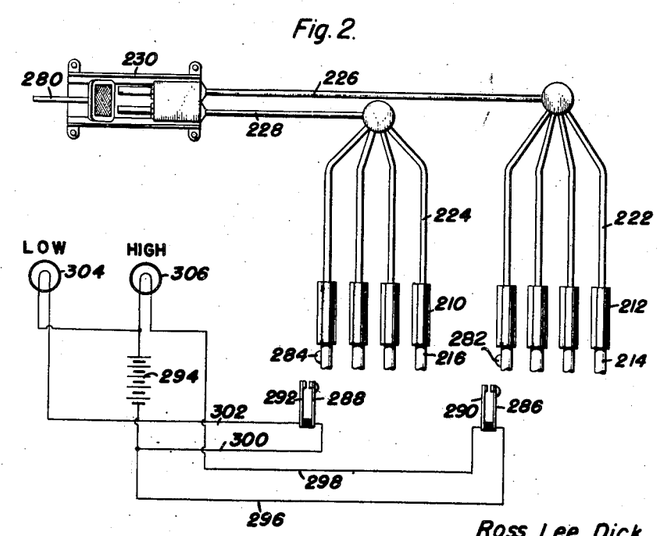
Figure 2 is a diagrammatic view of the actuating and indicating element of the invention.
Figure 4:
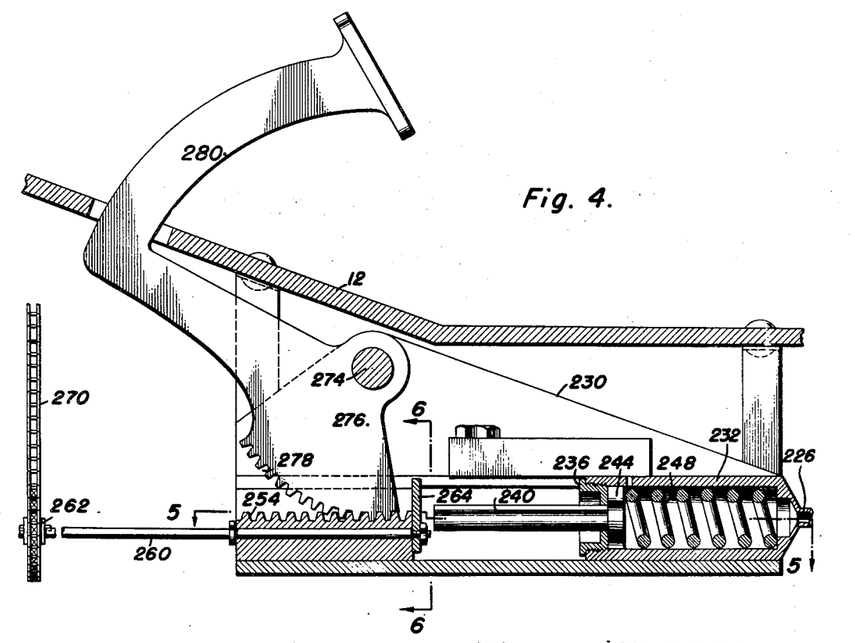
Figure 4 is a fragmentary vertical sectional view of a portion of the control and actuating mechanism of the invention.
Figure 5:
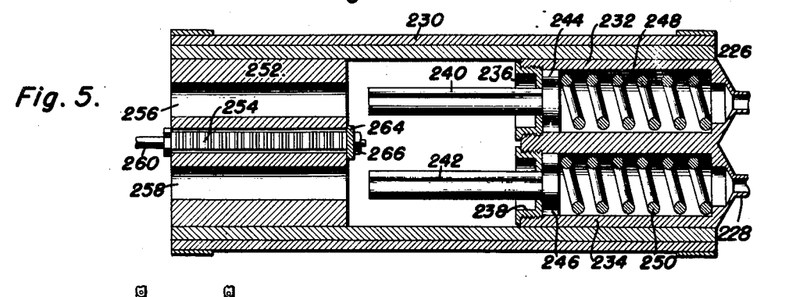
Figure 5 is a horizontal sectional view taken substantially upon the plane of the section line 5—5 of Figure 4.
Figure 6:
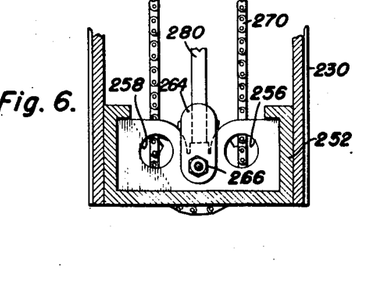
Figure 6 is a vertical transverse sectional detail view taken substantially upon the plane of the section line 6—6 of Figure 4.

To this end, each of the cylinders 210, 212 is provided with fluid pressure conduits 222, for the cylinders 212 controlling and actuating the regular drive sleeve assembly, and 224 for those cylinders which control and actuate the overdrive sleeve assembly, these sets of cylinders, plungers and conduits being indicated diagrammatically in Figure 2. The two sets of conduits 222 and 224 are respectively connected with fluid pressure supply lines 226 and 228 which extend to any suitable source of fluid pressure such as a pump cylinder casing 230, see also Figures 4 and 5, in which are provided a pair of pump cylinders 232 and 234 connected at their outer ends with the supply conduits 226 and 228, respectively. The inner ends of these cylinders are provided with removable cylinder heads 236 and 238 through which are slidably received piston rods 240 and 242 respectively provided with pistons 244 and 246 slidable in the cylinders 232 and 234. Compression springs 248 and 250 are disposed in these cylinders and yieldingly urge the pistons 244 and 246 to their outer position as shown in Figure 5. Likewise secured in the casing 230 is a slide block 252 having longitudinally and medially disposed rack teeth 254 upon its upper surface, and having a pair of bores 256 and 258 respectively aligned with the piston rods 240 and 242 for loosely and slidably receiving the same. Carried by and journaled in and extending longitudinally through the slide block 252 is a shaft 260 which is provided with an actuating sprocket gear 262 at its outer end, and at its inner end has detachably but fixedly secured thereto a control plate 264, as by a fastening nut. The plate is so arranged that upon proper rotation of the shaft 260, the plate may be selectively disposed to cover either of the bores 256 or 258 as desired, or may be positioned in a neutral position so that neither of these bores is covered, as shown in Figures 4-6.

Journaled in the dash 10 of the vehicle, as shown in Figure 1, is a control shaft 266, one end of which is provided with a sprocket gear 268 which is connected with the sprocket 262 as by a sprocket chain 270, while the other end of the shaft 266 is provided with a fixedly attached operating handle 272. The arrangement is such that upon rotation of the handle 272, by means of the sprocket chain connection, the plate 264 will be selectively disposed over one of the bores 256 or 258 to cover the same, or in an intermediate position so that neither of these bores will be covered.

Journaled for oscillation upon a transversely extending pivot pin 274, within the walls of the casing 230, is a segmental plate 276 having gear teeth 278 thereon for registry with the rack teeth 254. A foot pedal 280 is connected with the sectorial plate 276 and extends through the floor board 12 of the vehicle for actuation by the driver.

From the foregoing, it will be seen that when the pedal 280 is depressed, the segmental gear teeth 278 will engage the rack teeth 254, thus moving the slide 252 towards the pump cylinders. When the control disk 264 is in its neutral position, each of the piston rods 240 and 242 is free to extend into the bores 256 and 258, whereby movement of the slide will not actuate the piston rods.

However, by properly rotating the control handle 272, the disk 264 may be selectively positioned to cover either of the bores 256 or 258, whereby the corresponding piston rod 240 or 242 will be engaged by the slide 252 when the latter is moved to the right as viewed in Figure 5. Under these conditions, either the piston 244 or the piston 246 may be selectively actuated in its cylinders 232 and 234 to deliver a fluid impulse through the fluid supply conduit 226 or 228 and thereby operate the respective sets of plungers 214 and 216, thus actuating the desired ring gear assembly. Any suitable means, not shown, such as a spring or the like may be attached to the control pedal 280 for yieldingly urging the pedal, segmental plate 276 and slide 252 to their retracted position as shown in Figures 4 and 5.

It is further desirable to provide a means for indicating to the operator of the vehicle which particular gearing assembly is in operative position. For this purpose, a signalling system indicated in Figures 2 and 3 may be employed. One of the plungers 214 or 216 is preferably provided with an actuating cam 282 and 284, which, when these plungers are actuated by the hydraulic pressure, is adapted to engage respectively with flexible switch contact 286 or 288 cooperating with stationary contacts 290 and 292 carried by any suitable part of the differential housing section 34, not shown. By means of a battery 294 and suitable electric conductors 296, 298, 300 and 302, the two switches are respectively connected to signal lights 304 and 306 suitably mounted upon the dash of the vehicle in a position adjacent the handle 272 as shown in Figure 3. The arrangement is such that the handle 272 will point towards the signal light which is connected with the gearing assembly that has been actuated into operative position, this signal light being energized by engagement with the corresponding plunger lug 282 or 284 with the corresponding movable switch contact 286 or 288. By this means, the operator is at all times advised as to which of the gearing assemblies is engaged, and both the signal lights and the handle 272 will indicate this information.

It should be here noted that the sliding movement of the shaft 260 is relatively small, so that there can be sufficient flexure of the sprocket chain 270 to permit this movement without interrupting the driving connection of the control shaft 266 with the shaft 260.

Figure 15:
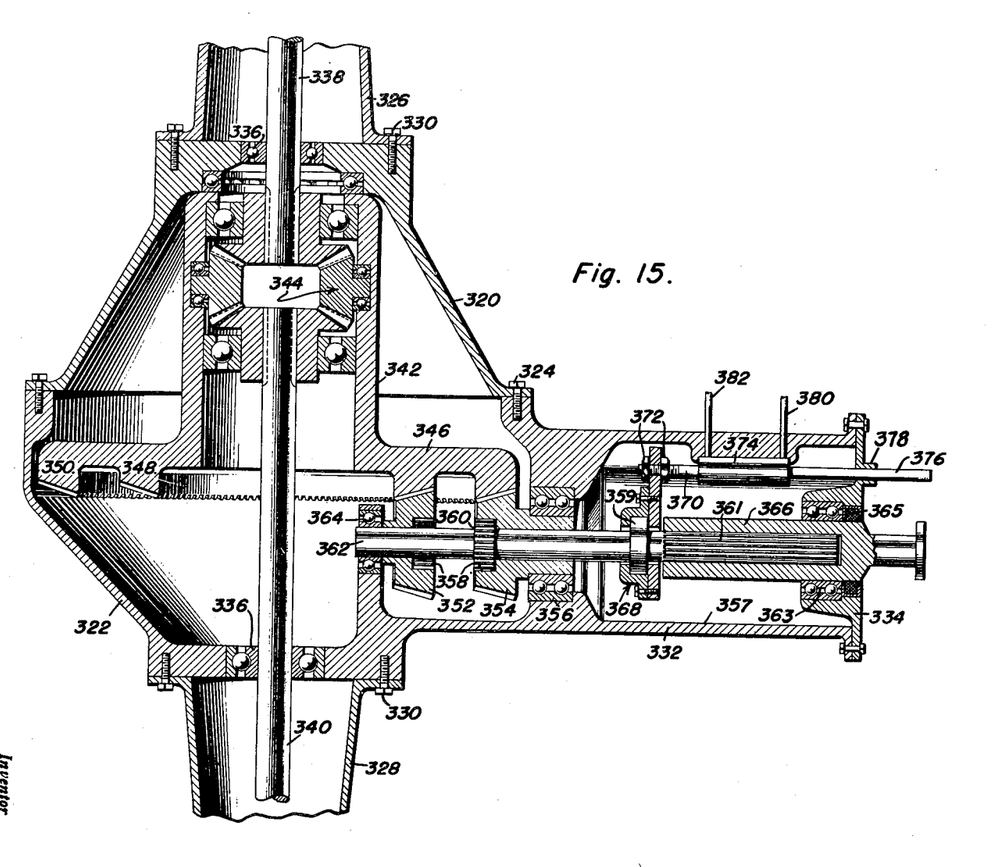
Figure 15 is a vertical horizontal sectional view of a modified ring gear and pinion assembly.

Attention is now directed more particularly to Figure 15 which shows a modified means for varying the gear ratio of the differential assembly of a motor vehicle by the same control means disclosed in Figures 1-6. In this assembly, the differential housing consisting of the two casing members 320 and 322 are connected together at a flanged joint as by bolts 324, and these housing sections are likewise connected in a conventional manner with the customary axle housings 326 and 328 by flanged connections by means of bolts 330. Integrally or detachably carried by the housing section 322 is a pinion gear and shaft housing 332 provided with a forward cover plate 334. Journaled in the differential housing sections as by bearing assemblies 336 are rear axle sections 338 and 340 which extend into a differential cage assembly, indicated at 342, and are connected to each other and to this cage assembly by any suitable differential mechanism indicated generally at 344.

The differential cage 342 has integrally or rigidly attached thereto in any desired manner a flange 346 having a pair of concentric ring gears 348 and 350 thereon, these ring gears respectively constituting the overdrive ring gear and the regular drive ring gear of the mechanism. Except for the provision of these two sets of ring gears upon the differential cage 342, the construction so far described is of any conventional nature.

In constant mesh with the ring gears 348 and 350 are a pair of pinions 352 and 354, respectively, the latter being rotatably but non-slidably carried by a bearing assembly 356 which is fixedly secured in the pinion shaft housing 332, while the former is mounted in any similar suitable manner in the differential housing section 322. The adjacent faces of the pinions 352, 354 are provided with recesses 358 which are internally splined to receive a correspondingly splined member 360 formed upon a sliding pinion shaft 362 journaled in the housing section 322 as in a bearing assembly 364, and at its other end extending through the hub portion of the pinion 354 and into a chamber 357 at the forward end of the pinion housing 332. At its forward end, the pinion shaft 362 is provided with a collar or annular shoulder 359 and beyond this collar is provided with a longitudinally splined portion 361.

Journaled in the cover plate 334 as by a bearing assembly 363, and provided with any conventional lubricant sealing means 365, is an internally splined sleeve member 366 which is adapted to be connected in any suitable manner to the driving shaft of the vehicle, and has a splined engagement with the axially shiftable pinion shaft 362 for driving the same.

Loosely embracing the pinion shaft 362 and the collar 359 thereon is a shifting yoke of any desired construction indicated generally by the numeral 368, this yoke being adjustably carried by one end of an actuating shaft 370, as by means of adjusting nuts 372 thereon, this shaft extending through a cylinder 374 and having its forward end 376 extending through a tubular boss 378 formed in the cover plate 334. The cylinder 374 provides actuating means for shifting the shaft 370 and through the yoke 368 moving the pinion shaft 362 in an axial direction to selectively engage the splined portion 360 with the splined recesses 358 of the pinion gears 352 and 354. By shifting the pinion shaft 362, it will thus be seen that the driving sleeve 366 and the pinion shaft 362 thus can selectively operatively connect one of the pinions 352 and 354 with the corresponding ring gear and thereby establish either the direct drive or an overdrive relation of the differential and axle assemblies.

The actuating mechanism can be of the same nature as that set forth in Figures 1-6, by merely providing a piston upon the shaft 370 for movement within the cylinder 374, and by supplying fluid pressure through conduits 380 or 382 to thus selectively move the shaft 370 to either of its two positions in the end of the cylinder 374. Alternatively, it is evident that the cylinder 374 could be in the nature of an electric solenoid, with the members 380 and 382 constituting electric cables for selectively energizing one end or the other of the solenoid and thereby effecting the shifting movement of the shaft 370.

The forward extremity 376 can constitute a switch actuating member to actuate any suitable electric circuit and thereby indicate to the driver of the vehicle the relative positions of the shaft 370 which corresponds to the selective engagement of the selective pinions with their ring gears.

From the foregoing, the construction and operation of the device will now be understood, and further explanation is believed to be unnecessary. However, since numerous modifications and changes will readily occur to those skilled in the art after a consideration of the foregoing specification and accompanying drawings, it is not desired to limit the invention to the exact constructions shown and described, but all suitable modifications and equivalents may be resorted to, falling within the scope of the appended claims.

Having disclosed and described the invention, what is claimed as new is as follows:

1. A transmission gearing assembly comprising a driven member, a pair of ring gears slidable upon said member and relative to each other, a driving pinion for each ring gear, resilient means urging each ring gear away from its pinion, an actuating means for sliding each ring gear into engagement with its pinion, and latch means for each ring gear operative to lock their respective ring gears in engagement with their driving pinions, each latch means being connected to the other ring gear for release from its own ring gear when the other ring gear is moved into engagement with its pinion.

2. A transmission gearing assembly comprising a rotatable driven member, concentric sleeves slidable but non-rotatably mounted upon said member and each other, a pair of ring gears on each of said sleeves, a driving pinion engageable with each ring gear, springs on said drive member urging the ring gear sleeves away from said pinions, an actuating means for sliding each of the ring gear sleeves into engagement with one of said pinions, a latch means for each ring gear sleeve mounted on said member, each latch means being connected to one of said ring gear sleeves for operation thereby to alternately lock and release the other ring gear sleeve from its pinion engaging position.

3. The combination of claim 2 wherein said ring gear sleeves have longitudinal registering slots, said latch means extending through said slots.

4. The combination of claim 2 wherein said ring gear sleeves have longitudinal registering slots, said latch means extending through said slots, said latch means comprising levers pivoted on said member, said levers having a first arm constituting a latch for one ring gear sleeve and a second arm connected to the other ring gear sleeve in the slots thereof for operation of said lever upon movement of said other ring gear sleeve.

5. The combination of claim 2 wherein said ring gear sleeves have pressure plates thereon, said actuating means including a pressure operated carrier actuating plunger for the pressure plate of each ring gear sleeve.

6. The combination of claim 2 wherein said actuating means comprises a hydraulic system including a conduit with an actuating plunger for each ring gear sleeve, an operating piston in each conduit, a foot operated slide for imparting movement to said operating pistons and selector means for rendering said slide ineffective to move one of said operating pistons.

7. The combination of claim 6 wherein said slide includes bores, a piston rod on each operating piston slidable in one of said bores, and means for selectively blocking sliding movement of said piston rods in said bores.

8. The combination of claim 7 wherein said last means comprises a shaft journaled in said slide, a plate on said shaft rotatable to positions for selectively closing one of said bores, a control lever, means connecting said control lever to said shaft for operating said plate.

9. A transmission gearing assembly comprising a rotatable driven member, concentric carriers slidable but non-rotatable upon said member and each other, a pair of ring gears on two of said carriers, a driving pinion engageable with each ring gear, springs on one carrier urging the ring gear carriers away from said pinions, an actuating means for sliding each of the ring gear carriers into engagement towards one of said pinions, a latch means for each ring gear carrier mounted on said one carrier, each latch means being connected to one of said ring gear carriers for operation thereby to alternately lock and release the other ring gear carrier from its pinion engaging position and signal means responsive to the engagement of a ring gear with its pinion.

10. A variable speed transmission gearing comprising a driving shaft having a pair of pinions and a driven member, a carrier slidably mounted on said driving member, an inner sleeve slidable upon said carrier and having a ring gear movable therewith for engagement with one pinion, an outer sleeve slidable on said inner sleeve and having a ring gear movable therewith to engage the other pinion, spring means urging each sleeve away from said pinions, an actuating means for each sleeve for moving the ring gear carried thereby into engagement with its pinion, latch means mounted on said carrier and engageable with each of said sleeves, said latch means comprising a first set of levers operable by said inner sleeve to lock said outer sleeve in ring gear and pinion engaging position and a second set of levers operable by said outer sleeve for locking said inner sleeve into ring gear and pinion engaging position.

ROSS LEE DICK.

REFERENCES CITED

The following references are of record in the file of this patent:

UNITED STATES PATENTS

| Number | Name | Date |
|---|---|---|
| 931,289 | Evans | Aug. 17, 1909 |
| 955,244 | Wynn | Apr. 19, 1910 |
| 1,147,524 | McDougal | July 20, 1915 |
| 1,988,182 | Weiland | Jan. 15, 1935 |
| 2,113,860 | Sanford | Apr. 12, 1938 |

FOREIGN PATENTS

| Number | Country | Date |
|---|---|---|
| 36,970 | France | Sept. 13, 1930 |
| 300,487 | Germany | Sept. 13, 1917 |
| 428,692 | France | Sept. 5, 1911 |